United States Patent [19]

Wheelock et al.

[11] 4,002,720
[45] Jan. 11, 1977

[54] GAS DESULFURIZATION

[75] Inventors: Kenneth S. Wheelock; Geoffrey R. Say, both of Baton Rouge, La.

[73] Assignee: Exxon Research & Engineering Co., Linden, N.J.

[22] Filed: Dec. 24, 1974

[21] Appl. No.: 536,164

[52] U.S. Cl. .............................. 423/230; 423/244; 55/73; 55/74; 252/462

[51] Int. Cl.² .................................... B01D 53/34

[58] Field of Search .......... 423/210, 230, 231, 244, 423/564, 263; 55/73, 74; 252/462

[56] References Cited
UNITED STATES PATENTS 3,864,459  2/1975  Stiles .............................. 423/244 X Primary Examiner—Earl C. Thomas
Attorney, Agent, or Firm—Marthe L. Gibbons

[57] ABSTRACT

Hydrogen sulfide and its precursors can be selectively sorbed from gas streams containing the same by contacting the gas stream at elevated temperatures with a regenerable sorbent comprising a steam-treated support composited with a rare earth metal component. Presteaming the support lowers the amount of rare earth metal component needed to achieve a given activity level for hydrogen sulfide removal. Subsequent to sorption, the sorbent composite may be desorbed and regenerated by treatment with steam (desorption) and an oxidizing gas (regeneration). The sorbent capacity may be increased by the use of alkali or alkaline earth metal components as promoters. A preferred sorbent comprises lanthanum composited with presteamed alumina.

17 Claims, 1 Drawing Figure

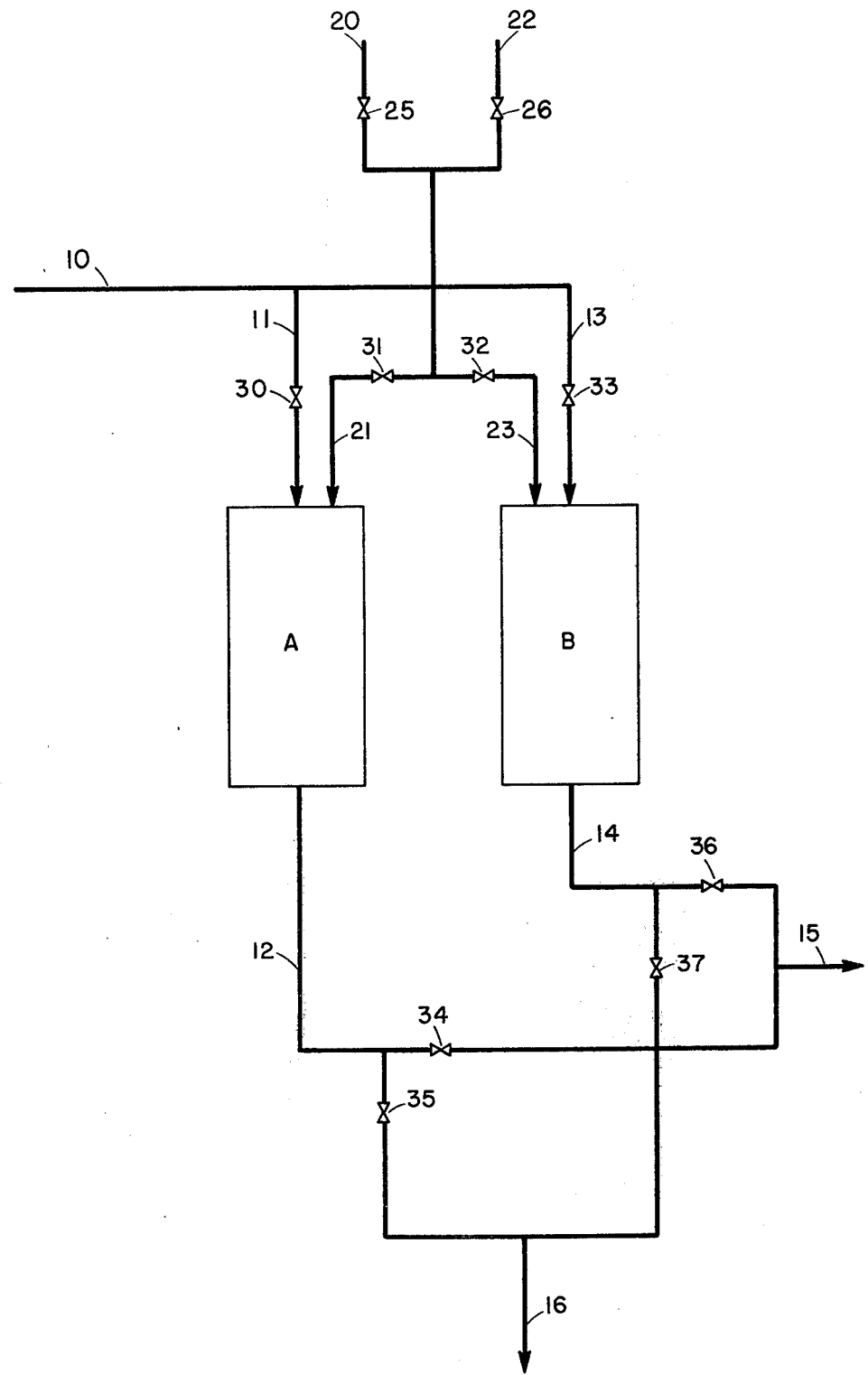

GAS DESULFURIZATION

BACKGROUND OF THE INVENTION

1. Field of the Invention

This invention relates to a gas desulfurizatin process utilizing a supported sorbent and to a method for the preparation of the supported sorbent. More particularly, this invention relates to the removal of acidic gases, such as hydrogen sulfide and precursors thereof, from a gaseous mixture by contacting the gaseous mixture with a regenerable sorbent comprising a stream-treated porous inorganic oxide support composited with one or more rare earth metal components.

2. Description of the Prior Art

The removal of hydrogen sulfide from gaseous streams is of primary importance to refiners. Thus, not only is hydrogen sulfide a catalyst poison for some downstream processing, e.g., methanation of carbon monoxide-containing streams, but environmental consideration dictate the removal of sulfur-containing components from fuel gases. The commercially available processes for hydrogen sulfide removal can be roughly divided into two categories, that is, low temperature processes, e.g., 200°–300° F. involving scrubbing the gas stream with liquid solutions such as mixtures of ethanolamines or mixtures comprising anthraquinone disulfonic acids, and high temperature proceses, e.g., about 1,000° F., involving contacting the gas stream with a bulk sorbent such as zinc oxide or ferric oxide.

The low temperature processes typically incorporate some regenerable compounds which also act as an oxidant, oxidizing the hydrogen sulfide to sulfur, in conjunction with a reductant, which regenerates the oxidant. The use of such processes, however, when the gaseous stream is to be combusted is disadvantageous since the gases normally produced at high temperature must be cooled before treatment for hydrogen sulfide removal. High temperature processes on the other hand lead to the formation of highly stable sulfides. Materials used in these processes can be roasted to release the sulfur as sulfur dioxide. However, roasting yields a dilute stream of sulfur dioxide (about 14%) which is costly to process if air is used as the oxygen source. More concentrated sulfur dioxide streams can be obtained by using oxygen to roast the sorbent, also a costly process. Steam may also be used but the amount of steam required is excessive. Thus, such sorbents are often discarded rather than being regenerated. Such a process is illustrated in U.S. Pat. No. 3,579,293 which discloses the use of supported ferric oxide and fly ash as the sorbent to overcome the disintegration of solid sorbents during repeated periods of burning.

It has now been found that by steam-treating a porous support prior to compositing it with a regenerable sorption active metallic component, the amount of sorption active metallic component necessary to achieve a given level of hydrogen sulfide (or precursors thereof) removal from gaseous mixtures can be significantly lowered.

SUMMARY OF THE INVENTION

In accordance with the invention there is provided a process for removing at least a portion of acidic gases selected from the group consisting of hydrogen sulfide, carbonyl sulfide and mixtures thereof from gaseous mixtures containing the same which process comprises contacting the gaseous mixture with a sorbent comprising (i) a steam-treated inorganic oxide support and (ii) at least one rare earth metal component.

Furthermore, in accordance with the invention there is also provided a method of preparing a supported sorbent, which method comprises first steam treating an inorganic oxide support and subsequently adding the metallic component to the steam-treated support.

The steam-treated inorganic oxide support is an essential component of the sorbent utilized in the process of the present invention.

The supported sorbent composite incorporating a steam-treated inorganic oxide may be regenerated by a two-stage process involving desorption, preferably with steam, to remove the hydrogen sulfide as hydrogen sulfide from the composited sorbent followed by treatment with an oxidizing gas. In this way, the regenerable sorbent may be used many times for the removal of hydrogen sulfide or its precursors from gas streams.

In one embodiment of the invention, an alkali or alkaline earth metal component is added to the supported sorbent to increase the sorption capacity of the supported sorbent for hydrogen sulfide.

In another embodiment of the invention, the supported sorbent acts as a catalyst for the conversion of carbonyl sulfide (a hydrogen sulfide precursor) to hydrogen sulfide by what is believed to be the following mechanism:

$$COS + H_2O \rightarrow H_2CO_2S \tag{1}$$

however, organic thio acids are known to be unstable resulting in

$$H_2CO_2S \rightarrow CO_2 + H_2S \tag{2}$$

the equilibrium favoring the stronger acid. Consequently, the resulting hydrogen sulfide is selectively sorbed and the gaseous feedstream is depleted of both hydrogen sulfide and carbonyl sulfide.

BRIEF DESCRIPTION OF THE DRAWING

The accompanying FIGURE is a process flow diagram of an embodiment of the invention.

DESCRIPTION OF THE PREFERRED EMBODIMENTS

The gas desulfurization process of the present invention is suitable for reducing the sulfide concentration of gaseous streams containing a sulfide gas such as hydrogen sulfide, carbonyl sulfide and mixtures thereof. The gaseous mixture containing a sulfide gas is treated by contacting it with a supported sorbent comprising a steam-treated porous inorganic oxide support composited with a rare earth metal component which may be an individual rare earth or a mixture of rare earths.

Suitable rare earth metal components include lanthanum, cerium, praseodymium, neodymium, promethium, samarium, europium, gadolinium, terbium, dysprosium, holmium, erbium, thulium, ytterbium, lutetium, that is, metals having an atomic number of from 57 through 71 inclusive, or mixtures thereof can be satisfactorily employed. The preferred metal components are lanthanum or didymium. The term "didymium" is used herein to designate a cerium-free mixture of rare earths comprising metals mainly of the first half of the rare earth series and primarily lanthanum, praseodymium and neodymium. More preferably, the metal component is a lanthanum component, lanthanum being the most abundant and therefore the most economically attractive of the metal components that can act as the active sorbent. Suitable support material include porous inorganic oxides, such as alumina, silica-alumina, titania, zirconia, magnesia, thoria, boria, chromia, vanadia and mixtures thereof, preferably alumina. The inorganic oxide support is subjected to a steam treatment prior to incorporation of the rare earth metal component. The surface area of the support material prior to the steam treatment generally ranges from about 100 to about 500 square meters per gram.

The steam treatment is carried out at a temperature ranging from about 700° to about 1,900° F., preferably from about 900 to about 1,700, more preferably from about 1,000 to about 1,600° F., for example 1,200° F., for a period of time ranging from about 60 to about 6,000 minutes, preferably from 480 to about 4,000 minutes, and at a pressure ranging from about atmospheric to about 200 psig. Steam or a gas mixture comprising steam such as a steam-air mixture can be used to treat the support. The steam treatment effects a reduction in the surface area of the support. Preferably, the steam treatment is conducted under such conditions and for a time sufficient to decrease the surface area of the support by about 20% relative to the unsteamed support. It is preferable to conduct the pre-steaming at a temperature higher than the temperature at which the finished supported sorbent will be utilized. For example, in the preparation of a sorbent intended for use at 1,000° F., it is preferable to presteam the support at 1,100° to 1,300° F., i.e., the temperature of presteaming would then be 100° to 300° F. higher than the temperature at which the process will be operated.

After the inorganic oxide support has been steam-treated, the rare earth metal components are composited with the steamed support in any suitable manner known in the art. For example, a solution of lanthanum nitrate may be contacted with a presteamed inorganic oxide support, i.e. steam-treated alumina, to impregnate the metal component on the steamed support. Suitable rare earth metal compounds of the desired metal components that can be utilized to impregnate the support include water soluble salts, i.e., nitrates, acetates, carbonates, etc., or hydrocarbon-soluble compounds. It is only important that the compound be decomposable to the oxide form during subsequent calcination. Impregnation is preferably effected under slightly acidic conditions since basic conditions may cause the metal component, i.e., $La(OH)_3$ to precipitate from solution thereby increasing the difficulty of impregnating the presteamed support. After impregnation, the rare earth metal-containing presteamed support may be dried by heating the composition to drive off moisture, for example, at a temperature ranging from about 212° F. to about 350° F. for a short period of time, i.e. 60 to 180 minutes, followed by calcination in air or other oxidizing atmosphere. Calcination may generally be effected at a temperature above about 900° F., preferably from about 900° F. to about 1,100° F. for at least eight hours, preferably about 12 to 24 hours. Desirably, the supported sorbent is calcined at the temperature of expected use, that is, if the sorption process is designed to operate at 1000° F., the supported sorbent is calcined at 1,000° F.; if the sorption process is designed to operate at 1,200° F., the supported sorbent is calcined at 1,200° F., etc.

The rare earth metal component may be present in the supported sorbent in any suitable sorption effective amount, considerations being the gaseous feedstream to be contacted and economical considerations regarding length of the sorption and the desorption cycles. Desirably, the rare earth metal component is present in amounts ranging from about 1 to 50 percent by weight of the support, preferably from about 5 to 35 weight percent, and more preferably from about 10 to 30 weight percent, calculated on the basis of the oxide thereof.

In a preferred embodiment, the lanthanum or other rare earth metal component can be supplemented by the addition of a promotor to increase the sorption capacity of the supported sorbent for hydrogen sulfide at lined out (that is, steady state) conditions. The promoter may be any of the alkali or alkaline earth metals whose oxides are basic anhydrides, e.g. sodium oxide, potassium oxide, calcium oxide, magnesium oxide, etc. or salts of these metals that decompose on heating to the basic anhydride, such as potassium nitrate which decomposes to potassium oxide. Preferably, potassium or sodium is employed as the promotor. Promotor effects are generally encountered at promoter concentrations of at least about 0.1 atom of promoter metal per atom of sorption active metal. Preferably, the ratio is at least about 0.1 to about 10 atoms of promoter metal per atom of sorption active metal, more preferably at least about 0.5 to 3 atoms of promoter metal per atom of sorption active metal and still more preferably from about 1 to about 2 atoms of promoter metal per atom of sorption active metal atom, e.g. 1.3:1.

The promoter is generally incorporated into the supported sorbent after impregnation of the rare earth metal component and calcination. Thus, solutions of the promoters, e.g. KOH, are basic in nature and could cause precipitation of the sorbent metal. The promoter solution is used to impregnate the calcined supported sorbent and then the promoted sorbent is dried and calcined as previously described. However, when promoter salts are employed such as the nitrates, impregnation of the steamed support by the promotor salt and the rare earth may be accomplished prior to drying and calcination, e.g. co-impregnation or serial impregnation.

In commercial use, the supported sorbent is employed preferably in a fixed bed which allows cyclic contact by the hydrogen sulfide-containing gas and steam during the desorption step.

The process of the invention is suitable for removing acidic gases, such as hydrogen sulfide and precursors thereof from a wide variety of gas mixtures including mixtures of predominantely inorganic gases such as gas streams comprising hydrogen and a carbon oxide, e.g. reducing gas. The process disclosed herein is particularly suitable to treat gas streams produced by the gasification of fluid coke, such as shown in U.S. Pat. No. 3,661,543, the teachings of which are hereby incorporated by reference. The gas streams produced in the gasification of fluid coke when gasification is effected by either air or oxygen have typical compositions as shown below:

|        | Air Gasification, Mole % | Oxygen Gasification, Mole % |
|--------|--------------------------|------------------------------|
| $H_2$  | 6.5                      | 24.2                         |
| $H_2O$ | 2.9                      | 20.0                         |

|  | Air Gasification, Mole % | Oxygen Gasification, Mole % |
| --- | --- | --- |
| CO | 19.9 | 34.2 |
| $CO_2$ | 7.9 | 19.8 |
| $N_2$ | 61.9 | 0.1 |
| $H_2S$ | 0.9 | 1.7 |

The actual gas composition to be treated can vary widely and may also include minor amounts of carbonyl sulfide (COS), e.g. 0.01 to 2.00 mole percent of COS, as well as some light hydrocarbons, e.g. methane.

The process is also suitable to treat gases produced or manufactured by the gasification of carbonaceous materials containing sulfur compounds such as coal, coke, whole or topped crudes, residua, distillates, e.g. naphtha, gas, oil, etc. A general treatment of gas producing processes may be found in the *Kirk-Othmer Encyclopedia of Chemical Technology*, Second Edition, Vol. 10 (1966), New York: John Wiley & Sons, Inc., pages 353 to 442. Natural gases containing hydrogen sulfide or its precursors, see Encyclopedia of Chemical Technology, supra, pages 443–460, may also be treated in accordance with this invention.

The sorption process is also applicable to hydrogen-containing recycle gas streams utilized in the hydrotreating of petroleum distillates, i.e. naphtha, atmospheric or vacuum gas oils, or residua. Such a gas stream may contain from about 90 mole percent hydrogen, 3 to 10 mole percent of hydrogen sulfide, and the balance being methane.

Generally, however, the gas stream may contain hydrogen sulfide or precursors thereof in any concentration since the only effect will be the time to breakthrough, that is, the point at which the capacity of the sorbent for sorbing hydrogen sulfide per incremental volume drops off rapidly, and regeneration of the sorbent may be desirable. However, the occurrence of breakthrough does not mean that the sorbent is completely inactive to sorbing hydrogen sulfide; rather, a possibly unacceptable high quantity of hydrogen sulfide passes through the sorbent unsorbed. Thus, regenerating the sorbent just prior to breakthrough point, which can be easily predetermined, is usually a preferred method of operation. Preferably, however, the gas stream will contain not more than about 10 mole percent hydrogen sulfide, more preferably not more than 5 mole percent hydrogen sulfide and most preferably not more than about 3 mole percent hydrogen sulfide.

An inert gas may be employed to dilute the gaseous feedstream but is normally not desirable since it will tend to overly dilute the feedstream. Such a gas may be steam, nitrogen, carbon monoxide, carbon dioxide, etc. or any like material so long as the gas does not have any oxidizing effect on the gaseous feedstream. The gaseous feedstream will preferably contain some steam, however.

In accordance with the present invention, the gaseous feedstream is brought into contact with a supported sorbent whereby hydrogen sulfide and its precursors, that is, carbonyl sulfide, are selectively sorbed, the remaining components of the gaseous feedstream passing through the sorbent substantially unaffected (carbonyl sulfide in the presence of steam will be hydrolyzed to hydrogen sulfide and sorbed and the sorbent also acts as a moderate water gas shift catalyst). The sorbent process is believed to proceed via the reversible formation of a rare earth metal sulfide or oxysulfide, regeneration perhaps being effected through a redox reaction.

Process conditions are not generally critical, however, equilibrium favors the formation of a metal sulfide (or oxysulfide) increasingly at increasing temperatures. Consequently, the process temperature is desirably above about 300° F., and ranges from about 300° to 1,700° F., preferably above about 500° F., more preferably from about 600° to about 1,100° F., and most preferably from about 700° to about 1,000° F.

The pressure is not critical and the sorption process can be operated at a wide range of pressures, for example, between about 0 to about 600 psig, preferably from about 0 to about 100 psig. Similarly, space velocity may also vary widely and can range from about 1 to 2,000 volumes of gas feed per volume of supported sorbent per hour, preferably from about 100 to about 1,500 volumes of gas feed per volume of supported sorbent per hour and still more preferably from about 300 to about 1,000 volumes of gas feed per volume of supported sorbent per hour.

Sorption capacity can generally be predetermined or easily measured by the breakthrough point. In any case, flow of the gaseous feedstream is then interrupted and the desorption cycle is commenced. As previously mentioned, desorption comprises a two-stage treatment involving contact of the hydrogen sulfide-loaded supported sorbent with steam to desorb the hydrogen sulfide in a concentrated gas stream followed by contacting the desorbed supported sorbent with an oxidizing atmosphere to complete the regeneration of the supported sorbent.

Desorption can be easily effected at temperature and pressure conditions similar to those employed for the sorption stage. In a preferred embodiment, desorption is effected at the same reaction conditions as sorption. This allows for a balanced operation with parallel reactor trains and recognizes the fact that desorption rate is mostly independent of temperature when the operation is effected at preferred conditions.

Desorption is effected by contacting the hydrogen sulfide-loaded supported sorbent with steam or a gas containing steam. Note that the steam treatment which is effected in the desorption stage is a steam treatment of the supported sorbent composite, in contrast to the steam treatment effected during preparation of the supported sorbent which is steam treatment of the support along prior to compositing the support with the metal component. The resulting product gas stream contains hydrogen sulfide in much greater concentrations than in the feed gas stream and it can be readily separated from the steam, e.g. that is, by condensation. The steam rate can vary widely ranging from about 0.1 to about 10 moles of steam per mole sorbed hydrogen sulfide per minute, preferably from about 0.5 to about 7 moles of steam per mole sorbed hydrogen sulfide per minute and, still more preferably from about 2 to about 5 moles of steam per mole sorbed hydrogen sulfide per minute. The desorption rate, however, is unaffected by increasing the steam rate above about 4 moles of steam per mole of sorbed hydrogen sulfide per minute. Taking into account total desorption rate and the amount of time required for desorption, the steam fed during desorption is about 1 to about 100 moles per mole of sorbed hydrogen sulfide, preferably about 10 to about 60 moles of steam per mole sorbed hydrogen sulfide and more preferably 20 to 40 moles steam per mole sorbed hydrogen sulfide. If desired, an inert carrier gas may be employed in ranges varying from about 1 percent to about 99 percent inert gas, for example, nitrogen, helium, argon and the like. It has also been found that inert gases, that is, nitrogen, may be utilized to purge a hydrated sorbent of sorbed hydrogen sulfide. Thus, a cerium-containing sorbent has been desorbed at the aforementioned process condition using nitrogen.

Completion of the desorbing stage can easily be determined by analyzing the product gas stream for hydrogen sulfide, for example, by scrubbing the gas with a solution of cadmium acetate, $Cd(C_2H_3O_2)_2$, and simultaneously measuring the volume of the gas. Hydrogen sulfide forms a yellow precipitate in cadmium solution, the pecipitate being cadmium sulfide. The precipitate is then treated with a known excess of iodine and back titrated with thiosulfate. Thus, the quantity of sulfur present is determined by knowing the volume of gas, and the average concentration of hydrogen sulfide in the gas can be calculated.

The steam desorbed supported sorbent may not have sufficient activity to be economically useful in subsequent sorption cycles and therefore contact with an oxidizing gas, such as air or oxygen or an oxygen-containing gas, is desirable to restore desorption activity of the sorbent, that is, to regenerate the sorbent. Contact with the oxidizing gas can also be effected at temperature and pressure conditions similar to those utilized in the sorption and desorption cycles. The period of contact will generally be for a time sufficient to secure the desired degree of reactivation of the supported sorbent, usually a few minutes and will vary as a function of temperature and gas flow rate. Reactivation is generally effected in at least about 5 minutes but the air contact period may range from about 5 minutes to 1 hour at space velocities ranging from about 1 to about 3,000 volumes of air per volume of supported sorbent per hour, preferably from about 100 to 2,000 volumes of air per volume of supported sorbent per hour, more preferably from about 500 to about 2,500 volumes of air per volume of supported sorbent per hour. The determination of optimum air contact times can be easily established for any given set of conditions, that is, temperature, sorbent composition, hydrogen sulfide capacity of the sorbent.

The regeneration should result in restoration of the desired degree of sorbent capacity for sorbing hydrogen sulfide and its precursors. Depending on the efficiency of regeneration, the efficiency of removing hydrogen sulfide during sorption increases with the thoroughness of the regeneration. However, the point of breakthrough typically remains the same when the sorbent exhibits lined-out (steady state) behavior. If regeneration is poor, then the efficiency of sorption drops and if regeneration is very poor or incomplete, the capacity up to the point of breakthrough is diminished. The efficiency of sorption is the percent hydrogen sulfide removed up to the point of breakthrough. The capacity is how much hydrogen sulfide the supported sorbent can sorb. Regeneration is desorption treating with an oxidizing gas. The sorbent is useful because capacity reaches an essentially constant value from cycle to cycle, that is, it has lined-out.

The FIGURE shows a balanced sorption-desorption operation carried out in parallel reactor trains and where the time period for sorbent is substantially equal to the time period for desorption/activation.

Turning to the FIGURE and assuming for the moment that the sorption is being carried out in reactor A and desorption in reactor B, a gaseous mixture is fed by line 10 through open valve 11 into reactor A which contains a sorbent comprising lanthanum oxide on presteamed alumina and where hydrogen sulfide is selectively sorbed and the cleaned up product gas exits reactor A in 12 through open valve 34 and thence to downstream processing in line 15. At the same time as sorption is being carried out in reactor A, the sorbent in reactor B is undergoing desorption/activation. First steam with or without an inert carrier gas is fed from line 20 through open valves 25 and 32 into reactor B via line 23. The desorbed product gas stream containing steam and hydrogen sulfide exits reactor B by line 14, open valve 37 and via line 16 to hydrogen sulfide recovery. Subsequent to steam desorption, valve 25 is closed and air is fed through line 22 and open valves 26 and 32 into reactor B via line 23 to activate the sorbent. The air exits in the same manner as the desorbing steam or may exit through a separate line (not shown).

When the supported sorbent in reactor A has reached capacity, the desorbing/activation operation in reactor B is substantially complete and the reactors are switched, that is, reactor B will go on the sorption cycle while reactor A will go on the sorption cycle while reactor A will go on the desorption/activation cycle. Thus, valve 11 is closed and 33 opened to permit feed gas in line 10 to enter line 13 in rector B. Treated feed gas exits line 14 and valve 37 is closed while valve 36 is opened and treated gas is collected from line 15. Similarly, the desorption/activation cycle is carried out in reactor A by sequentially opening and closing valves 25 and 26, 31 and 32 and 34 and 35.

A balanced cycle is one wherein the time spent regenerating the sorbent is equal to or less than the time spent sorbing. To illustrate this point assume the following: given a sorbent capacity of 220 volumes of gas containing 1.05 percent hydrogen sulfide per volume of supported sorbent, that is, 100% removal of $H_2S$ from 220 volumes of gas containing 1.05% $H_2S$, breakthrough will occur after 22 minutes of sorption at 600 V/V/hour. This means that the regeneration time cannot exceed 22 minutes. Specifying an air treat of 1,000 V/V/hour for 10 minutes, there are 12 minutes in which to accomplish the desorption in order to maintain a balanced cycle. If 30 moles of steam are to be used per mole of sorbed hydrogen sulfide, then the steam feed rate during desorption is 2.5 moles of steam per mole of sorbed hydrogen sulfide. Hence,

| | | |
|---|---|---|
| Sorption: | | |
| | V/V/hour | 600 |
| | Capacity to breakthrough | 220 Volume/Volume |
| | Time | 22 minutes |
| Desorption: | | |
| | Steam Quantity | 30 moles per mole sorbed $H_2S$ |
| | Steam Rate | 2.5 moles per mole sorbed $H_2S$/min. |
| | Time | 12 minutes |
| Air Treat: | | |
| | V/V/hour | 1,000 |
| | Time | 10 minutes |
| | Sorption Time | 22 minutes |
| | Regeneration Time (Desorption and air treat) | 22 minutes |
| | Total Cycle Time | 44 minutes |

The following examples will serve to illustrate further the invention.

EXAMPLE

Various sorbents and support materials were tested for activity in sorbing hydrogen sulfide from a gas stream of the following composition:

| Component | Mole Percent of Component |
|---|---|
| $H_2S$ | 0.96 |
| $CH_4$ | 2.75 |
| $CO$ | 20.08 |
| $CO_2$ | 6.74 |
| $H_2$ | 9.08 |
| $N_2$ | 51.69 |
| $H_2O$ | 8.70 | at a space velocity of 700 volumes of gas mixture per volume of supported sorbent per hour at a temperature of 1,000° F. and 0 psig. After hydrogen sulfide breakthrough, the sorbed hydrogen sulfide was desorbed with steam and the sorbents were each subsequently given an air treat. This cycle was repeated 27 times.

Sorbent A, which is a supported sorbent in accordance with the present invention, was made as follows: a high purity commercially available alumina having a surface area of about 250 square meters per gram, as measured by the B.E.T. nitrogen absorption method set forth in the *Journal of the American Chemical Society*, Vol. 57, pg. 1154 (1935) was steamed at 1,200° F. for 960 minutes at atmospheric pressure. This treatment reduced the surface area of the alumina to about 190 square meters per gram. This alumina was subsequently impregnated with $La(NO_3)_3 \cdot 6H_2O$ such that the final concentration of the rare earth component would be 12.5 weight percent $La_2O_3$ and calcined at 1,000° F. in air for 16 hours. This preparation was subsequently impregnated with KOH such that the final concentration of alkali as related to the concentration of rare earth metal was 13 atoms of K for every 10 atoms of La and calcined at 1,000° F. in air for 16 hours.

Sorbent B, which is also a supported sorbent, was prepared as follows: a high purity commercially available alumina identical to that used to prepare sorbent A, having a surface area of about 250 square meters per gram, as measured by the B.E.T. method indicated above, without any presteaming, was impregnated with $La(NO_2)_3 \cdot 6H_2O$ such that the final concentration would be 25 weight percent $La_2O_3$ and calcined at 1,000° F. in air for 16 hours. This preparation was subsequently impregnated with KOH such that the final concentration of alkali as related to the concentration of rare earth metal was 13 atoms of K for every 10 atoms of La and calcined at 1,000° F. in air for 16 hours.

Sorbent C is the steamed alumina used to prepare Sorbent A, that is, Sorbent C is an alumina identical to that used in the preparation of Sorbents A and B having a surface area of about 250 square meters per gram which was steamed at 1,200° F. for 960 minutes at atmospheric pressure to result in a steamed alumina having a surface area of about 190 square meters per gram. Thus, Sorbents A and C are identical except for the presence of the rare earth and other metals in Sorbent A.

Sorbent D is the alumina used to prepare Sorbent B, that is, it is an alumina identical to that used to prepare Sorbent B and differs from Sorbent B only in that the rare earth and other metals are absent from the composition. Thus, all four sorbents were prepared from the same commercially available alumina. Sorbent A and C were presteamed whereas Sorbent B and D were not presteamed. Sorbent A and B contained rare earth metal components whereas Sorbents C and D did not contain rare earth metal components. Furthermore, Sorbents A and B contained alkali metal promoters.

Comparative experiments were made utilizing Sorbent A, which is the sorbent in accordance with the present invention, with the other sorbents (that is, with Sorbents B, c and D) to test the ability of these sorbents to remove hydrogen sulfide and precursors thereof from gaseous mixture containing them.

The results of these experiments are reported in the following table.

TABLE

| Sorbent | A | B | C | D |
|---|---|---|---|---|
| Rare Earth Metal (Wt. %) | 12.5 | 25.0 | 0 | 0 |
| Atomic Ratio K to Rare Earth Metal | 0 | 0 | | |
| Fresh[1] Surface Area ($m^2/g$) | 188.4 | 253.3 | | |
| Fresh Pore Volume (cc) | 0.292 | 0.246 | 0.613 | 0.565 |
| Fresh Average Pore Radius (A) | 94.9 | 74.3 | 78.5 | 59.3 |
| Steaming Temperature (° F) (Presteaming Treatment) | — | — | | |
| Lined-out Capacity for $H_2S$ Sorption, V/V/hr.[3] | | | | |
| Discharged[2] Surface Area ($m^2/g$) | 120.3 | 72.6 | — | — |
| Discharged Pore Volume (cc) | 0.469 | 0.233 | — | — |
| Discharged Average Pore Radius (A) | 87.9 | 93.8 | — | — |

[1]Fresh, that is, prior to sorption.
[2]Discharged, that is, after sorption.
[3]V/V/hr.=volumes of 1% $H_2S$ containing-gas per volume of sorbent per hour.

As can be seen from the data in the table, the hydrogen sulfide removal process utilizing Sorbent A, which has been prepared in accordance with the present invention (that is, presteaming of the support prior to incorporation of sorptive active metallic components), gave a higher lined-out (steady state constant capacity) than Sorbent B even though Sorbent A comprised only half the amount of sorption active metallic components than Sorbent B. Thus, presteaming of the inorganic oxide support permitted decreasing the amount of lanthanum sorbent in the sorbent composite without loss of sorption capacity.

This result is indeed surprising since it would be expected that the capacity of the rare earth sorbent for hydrogen sulfide removal from gaseous mixtures would increase with increasing concentration (weight percent) of sorption active rare earth component, up to a certain limit, whereas, as shown by the above experiments, Sorbent A (which is the sorbent in accordance with the present invention) contained about half the quantity of rare earth metal component than Sorbent B to achieve a given level of hydrogen sulfide removal.

What is claimed is:
1. A process for removing by sorption at least a portion of acidic gases selected from the group consisting of hydrogen sulfide, carbonyl sulfide and mixtures thereof from a gaseous mixture containing the same, which process comprises: contacting said gaseous mixture with a sorbent comprising (i) a pre-steamed inorganic oxide support selected from the group consisting of alumina, silica-alumina, zirconia, magnesia, boria and vanadia and (ii) a rare earth metal component.

2. The process of claim 1, wherein said rare earth metal component is an individual rare earth metal component or a mixture of rare earth metal components.

3. The process of claim 1, wherein said rare earth metal component comprises lanthanum.

4. The process of claim 1, wherein said rare earth metal component is a mixture of rare earth metal components comprising lanthanum, praseodymium, and neodymium.

5. The process of claim 1, wherein said inorganic oxide support is alumina.

6. The process of claim 1, wherein said gas mixture is contacted with said sorbent at a temperature in excess of 300° F.

7. The process of claim 1, wherein said sorbent additionally contains a promoter selected from the group consisting of an alkali metal component, an alkaline earth component and mixtures thereof.

8. The process of claim 1 wherein after said contacting step whereby at least a portion of said acidic gases are sorbed on said sorbent, the additional step of desorbing the sorbed acidic gases from said sorbent by contacting the acidic gas-loaded sorbent with steam.

9. The process of claim 8, wherein the desorbed sorbent is regenerated by contacting the desorbed sorbent with an oxidizing gas for a period of time sufficient to regenerate the sorbent.

10. A cyclic process for removing by sorption at least a portion of acidic gases selected from the group consisting of hydrogen sulfide, carbonyl sulfide and mixtures thereof from a gaseous mixture containing the same, which process comprises:
   a. contacting said gaseous mixture at a temperature of about 300° to 1,700° F. with a regenerable sorbent comprising (i) a pre-steamed inorganic oxide support selected from the group consisting of alumina, silica-alumina, zirconia, magnesia, boria and vanadia and (ii) a rare earth metal component selected from the group consisting of metals having an atomic number ranging from 57 to 71 and mixtures thereof;
   b. interrupting the flow of the gas stream at a predetermined time;
   c. contacting the sorbent with steam at a temperature ranging from about 300° to about 1,700° F. thereby desorbing said acid gases therefrom;
   d. contacting the desorbed sorbent with an oxidizing gas at a temperature of about 300° to about 1,700° F. for a period of time sufficient to regenerate said sorbent; and
   e. contacting the regenerated sorbent with the gas stream at the conditions of step (a).

11. The process of claim 10, wherein said inorganic oxide support has been steam—treated prior to compositing the same with said rare earth metal component.

12. A process for removing by sorption at least a portion of acidic gases selected from the group consisting of hydrogen sulfide, carbonyl sulfide and mixtures thereof from a gaseous mixture containing the same, which process comprises: contacting said gaseous mixture with a sorbent prepared by first steam treating an inorganic oxide support selected from the group consisting of alumina, silica-alumina, zirconia, magnesia, boria and vanadia and subsequently compositing the steamed inorganic support with a rare earth metal component.

13. The process of claim 12, wherein said rare earth metal component comprises lanthanum.

14. The process of claim 12, wherein said rare earth metal component comprises a mixture of rare earth metal components.

15. The process of claim 12, wherein said rare earth metal component is a mixture comprising lanthanum, praseodymium, and neodymium.

16. The process of claim 12, said inorganic oxide is alumina.

17. The process of claim 12, wherein said sorbent additionally comprises a promoter selected from the group consisting of an alkali metal component, an alkaline earth component and mixtures thereof.

* * * * *

UNITED STATES PATENT OFFICE
CERTIFICATE OF CORRECTION

PATENT NO. : 4,002,720
DATED : January 11, 1977
INVENTOR(S) : Kenneth S. Wheelock and Geoffrey R. Say It is certified that error appears in the above-identified patent and that said Letters Patent are hereby corrected as shown below:

Table appearing in column 10 should read:

Table

| Sorbent | A | B | C | D |
|---|---|---|---|---|
| Rare Earth Metal (Wt.%) | 12.5 | 25.0 | 0 | 0 |
| Atomic Ratio K to Rare Earth Metal | 13:10 | 13:10 | 0 | 0 |
| Fresh[1] Surface Area ($m^2/g$) | 117.2 | 93.4 | 188.4 | 253.3 |
| Fresh Pore Volume (cc) | 0.292 | 0.246 | 0.613 | 0.565 |
| Fresh Average Pore Radius (A) | 94.9 | 74.3 | 78.5 | 59.3 |
| Steaming Temperature (°F) (Presteaming Treatment) | 1200 | -- | 1200 | -- |
| Lined-out Capacity for $H_2S$ Sorption, V/V/hr.[3] | 220.0 | 182.9 | 15.0 | -- |
| Discharged[2] Surface Area ($m^2/g$) | 120.3 | 72.6 | -- | -- |
| Discharged Pore Volume (cc) | 0.469 | 0.233 | -- | -- |
| Discharged Average Pore Radius (A) | 87.9 | 93.8 | -- | -- |

[1] Fresh, that is, prior to sorption.
[2] Discharged, that is, after sorption.
[3] V/V/hr.=volumes of 1% $H_2S$ containing-gas per volume of sorbent per hour.

Signed and Sealed this

Nineteenth Day of April 1977

[SEAL]

Attest:

RUTH C. MASON
*Attesting Officer*

C. MARSHALL DANN
*Commissioner of Patents and Trademarks*